(12) United States Patent
Jiang et al.

(10) Patent No.: US 11,284,323 B2
(45) Date of Patent: Mar. 22, 2022

(54) METHOD AND DEVICE IN NODE FOR WIRELESS COMMUNICATION

(71) Applicants: Qi Jiang, Shanghai (CN); XiaoBo Zhang, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 138 days.

(21) Appl. No.: 16/790,759

(22) Filed: Feb. 14, 2020

(65) Prior Publication Data

US 2020/0267621 A1 Aug. 20, 2020

(30) Foreign Application Priority Data

Feb. 15, 2019 (CN) .......................... 201910116747.6

(51) Int. Cl.
| | |
|---|---|
| *H04W 36/28* | (2009.01) |
| *H04W 4/40* | (2018.01) |
| *H04W 52/36* | (2009.01) |
| *H04W 28/02* | (2009.01) |
| *H04W 36/30* | (2009.01) |

(52) U.S. Cl.
CPC ............. *H04W 36/28* (2013.01); *H04W 4/40* (2018.02); *H04W 28/0268* (2013.01); *H04W 36/30* (2013.01); *H04W 52/367* (2013.01)

(58) Field of Classification Search
CPC ....... H04W 36/28; H04W 36/30; H04W 4/40; H04W 52/365; H04W 52/367
See application file for complete search history.

(56) References Cited

U.S. PATENT DOCUMENTS

| | | | |
|---|---|---|---|
| 2015/0146633 A1* | 5/2015 | Kalhan ................. | H04L 1/1607 370/329 |
| 2015/0163791 A1* | 6/2015 | Chen ....................... | H04W 4/80 455/426.1 |
| 2017/0244468 A1* | 8/2017 | Zhao ..................... | H04W 36/24 |
| 2018/0139682 A1* | 5/2018 | Xu ........................ | H04W 40/12 |
| 2019/0313222 A1* | 10/2019 | Karampatsis ......... | H04W 8/245 |
| 2021/0028912 A1* | 1/2021 | Xu ........................... | H04W 4/70 |
| 2021/0153065 A1* | 5/2021 | Adjakple .......... | H04W 28/0263 |

* cited by examiner

*Primary Examiner* — Min Jung

(57) ABSTRACT

The disclosure provides a method and a device in a node for wireless communication. A first node first receives a first radio signal and a second radio signal, and transmits first information when a trigger condition is met. The first radio signal and the second radio signal are used for determining a channel quality of a first link and a channel quality of a second link respectively, the channel quality of the first link and the channel quality of the second link are used together for determining the trigger condition. The first information comprises a first parameter, and the first parameter is applied only to the first link of the first link and the second link. According to the above design, the triggering of PHR for a sidelink in V2X systems is associated with both the channel quality of the sidelink and the channel quality of a cellular link.

18 Claims, 15 Drawing Sheets

METHOD AND DEVICE IN NODE FOR WIRELESS COMMUNICATION

CROSS REFERENCE TO RELATED APPLICATION

This application claims the priority benefit of Chinese Patent Application No. 201910116747.6, filed on Feb. 15, 2019, the full disclosure of which is incorporated herein by reference.

BACKGROUND

Technical Field

The disclosure relates to transmission methods and devices in wireless communication systems, and in particular to a method and a device for power control in a Vehicle-to-Everything (V2X) system.

Related Art

Application scenarios of future wireless communication systems are becoming increasingly diversified, and different application scenarios have different performance requirements on systems. In order to meet different performance requirements of various application scenarios, the $3^{rd}$ Generation Partner Project (3GPP) Radio Access Network (RAN) #72 plenary session decided to conduct the study of New Radio (NR). The work item of NR was approved at the 3GPP RAN #75 session to standardize the NR.

In view of Vehicle-to-Everything (V2X) services developing rapidly, 3GPP has also started the initiation of standards formulation and researches under NR framework. At present, 3GPP has accomplished the work of formulation of requirements orienting 5G V2X services and has written it into standards TS22.886. 3GPP defines four use case groups for 5G V2X services, including Vehicles Platnooning, Extended Sensors, Advanced Driving and Remote Driving. The Study Item (SI) of technical research of NR V2X was approved at the 3GPP RAN #80 session, and, at the RANI 2019 first AdHoc session, it is approved to take a pathloss between a transmitting terminal and a receiving terminal in a V2X pair as a reference for a transmit power of V2X.

In discussions of Device to Device (D2D) in Rel-12/13/14 and V2X, a transmit power on a sidelink generally is obtained based on a pathloss between a base station and a terminal, so as to guarantee that a radio signal transmitted on the sidelink does not affect the uplink reception of the base station. In V2X based on NR in Rel-15, it is also needed to take the interference of radio signal between each V2X link into account.

SUMMARY

In LTE and NR systems, a terminal device transmits a Power Headroom Report (PHR) to a base station to notify the base station how much power the terminal has left for uplink transmission, thereby facilitating the base station to properly adjust and control the transmit power of the terminal. In V2X systems, when a pathloss between a transmitting terminal and a receiving terminal in a V2X pair is taken as a reference for a transmit power of V2X, the PHR for a sidelink also can improve the performance of power control on the sidelink. At present, one trigger mechanism of PHR in NR is that when a terminal detects two pathlosses obtained according to reference signals coming from a base station have a change greater than a certain threshold, the terminal triggers a report of PHR. Based on the above method, one simple trigger mechanism of sidelink PHR is that when two pathlosses of reference signals coming from a transmitting terminal in a V2X pair have a change greater than a certain threshold, the terminal will trigger a report of PHR for the sidelink. However, the V2X transmission first needs to consider interferences to a cellular network, moreover, one terminal would perform V2X communication with multiple terminals simultaneously, thus, the above simple method would cause the terminal to trigger a report of PHR frequently, thereby increasing payloads of control signalings and reducing spectrum efficiency.

In view of the above problems, the disclosure provides a solution. It should be noted that the embodiments of the first node and the third node of the disclosure and the characteristics in the embodiments may be applied to the base station if no conflict is incurred. Meanwhile, the embodiments of the disclosure and the characteristics in the embodiments may be mutually combined arbitrarily if no conflict is incurred.

The disclosure provides a method in a first node for wireless communication, wherein the method includes:
receiving a first radio signal and a second radio signal; and
transmitting first information when a trigger condition is met.

Herein, the first radio signal and the second radio signal are used for determining a channel quality of a first link and a channel quality of a second link respectively, the channel quality of the first link and the channel quality of the second link are used together for determining the trigger condition; the first information includes a first parameter, and the first parameter is applied only to the first link of the first link and the second link.

In one embodiment, the above method has the following benefits: the reporting of PHR on the first link (sidelink) is limited by the channel quality of the second link (cellular link), thereby avoiding frequently reporting the PHR of the first link and guaranteeing that the power control mechanism of the first link is adjusted only when no interference is generated to the transmission on the second link.

According to one aspect of the disclosure, the above method is characterized in that: the phrase that the trigger condition is met includes: a change in the channel quality of the second link is greater than a second specific threshold.

In one embodiment, the above method has the following benefits: the terminal will report the PHR of the sidelink only when the channel quality of the cellular link has an obvious change, that is to say, only when the interference of the V2X link that the cellular link can tolerate gets larger, the terminal can increase the value of the transmit power of V2X to improve the performance of V2X, thereby avoiding frequently triggering reporting of PHR.

According to one aspect of the disclosure, the above method is characterized in that: the phrase that the trigger condition is met includes: a change in the channel quality of the first link is greater than a first specific threshold.

In one embodiment, the above method has the following benefits: the terminal will report the PHR of the sidelink only when the channel quality of the sidelink has an obvious change, that is to say, the terminal needs to trigger the reporting of PHR only when a distance between a V2X pair is so long that it is needed to increase the value of the transmit power on the sidelink, thereby improving the performance of transmission on the sidelink.

According to one aspect of the disclosure, the above method is characterized in that: the first link corresponds to a first timer, the second link corresponds to a second timer, and both the first timer and the second timer have expired when the first node transmits the first information.

In one embodiment, the above method has the following benefits: different timers are configured for the sidelink and the cellular link respectively, and the reporting of PHR is triggered only when respective timer has expired, thereby reducing the payload of control signalings.

According to one aspect of the disclosure, the above method is characterized in that: the first radio signal is one of K1 first-type radio signals, the K1 first-type radio signals are used for determining K1 first-type channel qualities respectively, and the channel quality of the first link is one of the K1 first-type channel qualities.

In one embodiment, the above method has the following benefits: the K1 first-type radio signals are transmitted by K1 terminals respectively, the K1 terminals all perform V2X transmissions with the first node, and the K1 terminals share one PHR report, thereby reducing the frequency of PHR reporting and reducing the overhead of control signalings.

According to one aspect of the disclosure, the above method includes:
determining a first power value and a second power value.
Herein, the first link corresponds to a first maximum power value, a difference between the first maximum power value and the first power value is equal to the first parameter, and the channel quality of the first link is used for determining the first power value; the second link corresponds to a second maximum power value, a difference between the second maximum power value and the second power value is equal to a second parameter, and the channel quality of the second link is used for determining the second power value; and the first information includes the second parameter.

According to one aspect of the disclosure, the above method is characterized in that: the first information includes the first maximum power value.

According to one aspect of the disclosure, the above method includes:
receiving second information.
Herein, the second information includes at least one of the first maximum power value and the first timer.

The disclosure provides a method in a second node for wireless communication, wherein the method includes:
transmitting a second radio signal; and
receiving first information.
Herein, a first radio signal and the second radio signal are used for determining a channel quality of a first link and a channel quality of a second link respectively, the channel quality of the first link and the channel quality of the second link are used together for determining a trigger condition; a transmitter of the first information transmits the first information when the trigger condition is met; the first information includes a first parameter, and the first parameter is applied only to the first link of the first link and the second link.

According to one aspect of the disclosure, the above method is characterized in that: the phrase that the trigger condition is met includes: a change in the channel quality of the second link is greater than a second specific threshold.

According to one aspect of the disclosure, the above method is characterized in that: the phrase that the trigger condition is met includes: a change in the channel quality of the first link is greater than a first specific threshold.

According to one aspect of the disclosure, the above method is characterized in that: the first link corresponds to a first timer, the second link corresponds to a second timer, and both the first timer and the second timer have expired when the first node transmits the first information.

According to one aspect of the disclosure, the above method is characterized in that: the first radio signal is one of K1 first-type radio signals, the K1 first-type radio signals are used by the transmitter of the first information to determine K1 first-type channel qualities respectively, and the channel quality of the first link is one of the K1 first-type channel qualities.

According to one aspect of the disclosure, the above method is characterized in that: the first link corresponds to a first maximum power value, a difference between the first maximum power value and a first power value is equal to the first parameter, and the channel quality of the first link is used by the transmitter of the first information to determine the first power value; the second link corresponds to a second maximum power value, a difference between the second maximum power value and a second power value is equal to a second parameter, and the channel quality of the second link is used by the transmitter of the first information to determine the second power value; and the first information includes the second parameter.

According to one aspect of the disclosure, the above method is characterized in that: the first information includes the first maximum power value.

According to one aspect of the disclosure, the above method includes:
transmitting second information.
Herein, the second information includes at least one of the first maximum power value and the first timer.

The disclosure provides a method in a third node for wireless communication, wherein the method includes:
transmitting a first radio signal.
Herein, the first radio signal and a second radio signal are used for determining a channel quality of a first link and a channel quality of a second link respectively, the channel quality of the first link and the channel quality of the second link are used together for determining a trigger condition; a transmitter of first information transmits the first information when the trigger condition is met; the first information includes a first parameter, and the first parameter is applied only to the first link of the first link and the second link; and a receiver of the first radio signal includes a transmitter of the first information.

According to one aspect of the disclosure, the above method is characterized in that: the phrase that the trigger condition is met includes: a change in the channel quality of the second link is greater than a second specific threshold.

According to one aspect of the disclosure, the above method is characterized in that: the phrase that the trigger condition is met includes: a change in the channel quality of the first link is greater than a first specific threshold.

According to one aspect of the disclosure, the above method is characterized in that: the first link corresponds to a first timer, the second link corresponds to a second timer, and both the first timer and the second timer have expired when the first node transmits the first information.

According to one aspect of the disclosure, the above method is characterized in that: the first radio signal is one of K1 first-type radio signals, the K1 first-type radio signals are used by the transmitter of the first information to determine K1 first-type channel qualities respectively, and the channel quality of the first link is one of the K1 first-type channel qualities.

According to one aspect of the disclosure, the above method is characterized in that: the first link corresponds to a first maximum power value, a difference between the first maximum power value and a first power value is equal to the first parameter, and the channel quality of the first link is used by the transmitter of the first information to determine the first power value; the second link corresponds to a second maximum power value, a difference between the second maximum power value and a second power value is equal to a second parameter, and the channel quality of the second link is used by the transmitter of the first information to determine the second power value; and the first information includes the second parameter.

According to one aspect of the disclosure, the above method is characterized in that: the first information includes the first maximum power value.

The disclosure provides a first node for wireless communication, wherein the first node includes:

a first receiver, to receive a first radio signal and a second radio signal; and a first transmitter, to transmit first information when a trigger condition is met.

Herein, the first radio signal and the second radio signal are used for determining a channel quality of a first link and a channel quality of a second link respectively, the channel quality of the first link and the channel quality of the second link are used together for determining the trigger condition; the first information includes a first parameter, and the first parameter is applied only to the first link of the first link and the second link.

The disclosure provides a second node for wireless communication, wherein the second node includes:

a second transmitter, to transmit a second radio signal; and a second receiver, to receive first information.

Herein, a first radio signal and the second radio signal are used for determining a channel quality of a first link and a channel quality of a second link respectively, the channel quality of the first link and the channel quality of the second link are used together for determining a trigger condition; a transmitter of the first information transmits the first information when the trigger condition is met; the first information includes a first parameter, and the first parameter is applied only to the first link of the first link and the second link.

The disclosure provides a third node for wireless communication, wherein the third node includes:

a third transmitter, to transmit a first radio signal.

Herein, the first radio signal and a second radio signal are used for determining a channel quality of a first link and a channel quality of a second link respectively, the channel quality of the first link and the channel quality of the second link are used together for determining a trigger condition; a transmitter of first information transmits the first information when the trigger condition is met; the first information includes a first parameter, and the first parameter is applied only to the first link of the first link and the second link; and a receiver of the first radio signal includes a transmitter of the first information.

In one embodiment, compared with conventional schemes, the disclosure has the following advantages.

The reporting of PHR on the first link is limited by the channel quality of the second link, thereby avoiding frequently reporting the PHR of the first link and guaranteeing that the power control mechanism of the first link is adjusted only when no interference is generated to the transmission on the second link.

The terminal will report the PHR of the sidelink only when the channel quality of the cellular link has an obvious change, that is to say, only when the interference of the V2X link that the cellular link can tolerate gets larger, the terminal can increase the value of the transmit power of V2X to improve the performance of V2X, thereby avoiding frequently triggering reporting of PHR.

The terminal will report the PHR of the sidelink only when the channel quality of the sidelink has an obvious change, that is to say, the terminal needs to trigger the reporting of PHR only when a distance between a V2X pair is so long that it is needed to increase the value of the transmit power on the sidelink, thereby improving the performance of transmission on the sidelink.

Different timers are configured for the sidelink and the cellular link respectively, and the reporting of PHR is triggered only when respective timer has expired, thereby reducing the payload of control signalings.

The K1 first-type radio signals are transmitted by K1 terminals respectively, the K1 terminals all perform V2X transmissions with the first node, and the K1 terminals share one PHR report, thereby reducing the frequency of PHR reporting and reducing the overhead of control signalings.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
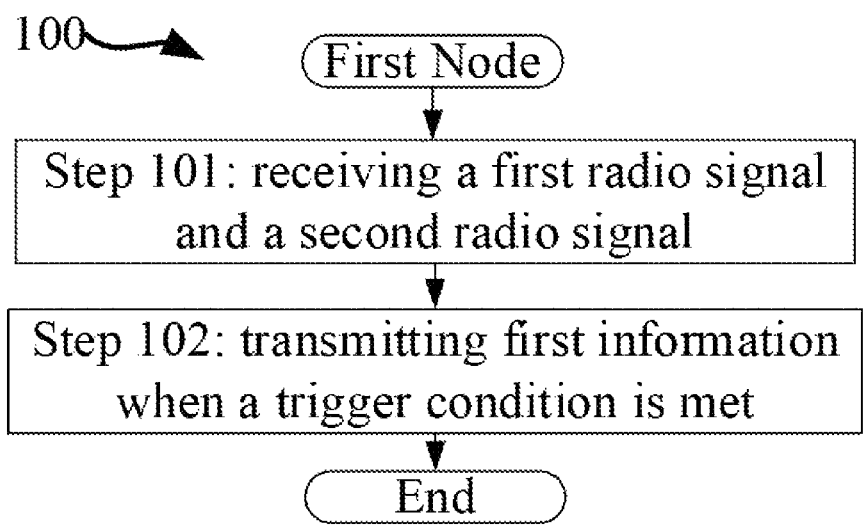
FIG. 1 is a flowchart of processing of a first node according to one embodiment of the disclosure.

Embodiment 1 illustrates an example of a flowchart of processing of a first node, as shown in FIG. 1. In 100 shown in FIG. 1, each box represents one step. In Embodiment 1, the first node in the disclosure receives a first radio signal and a second radio signal in S101, and the first node transmits first information when a trigger condition is met in S102.

In Embodiment 1, the first radio signal and the second radio signal are used for determining a channel quality of a first link and a channel quality of a second link respectively, the channel quality of the first link and the channel quality of the second link are used together for determining the trigger condition; the first information includes a first parameter, and the first parameter is applied only to the first link of the first link and the second link.

In one embodiment, the first link is a PC-5 link.

In one embodiment, the second link is a Uu link.

In one embodiment, the first link is a wireless link between a terminal and a terminal in V2X.

In one embodiment, the second link is a wireless link between a terminal and a base station in a cellular network.

In one embodiment, the first link corresponds to a sidelink.

In one embodiment, the second link corresponds to a cellular link.

In one embodiment, the first parameter includes a PHR for the first link.

In one embodiment, the first parameter is a PHR for the first link.

In one embodiment, the first parameter indicates a difference between a configured maximum transmit power value on the first link and a current transmit power value on the first link.

In one embodiment, the first parameter indicates a difference between a configured maximum transmit power value on the first link and an expected maximum transmit power value on the first link.

In one embodiment, the first parameter indicates a difference between a configured maximum transmit power value on the first link and a transmit power value on the first link estimated by the first node.

In one subembodiment of the above three embodiments, the configured maximum transmit power value is used for the first link.

In one subembodiment of the above three embodiments, the configured maximum transmit power value is a norminal maximum transmit power value of the first node.

In one subembodiment of the above three embodiments, the configured maximum transmit power value on the first link is in unit of dBm; the current transmit power value on the first link is in unit of dBm, or the expected maximum transmit power value on the first link is in unit of dBm, or the estimated transmit power value on the first link is in unit of dBm; and the first parameter is in unit of dB.

In one subembodiment of the above three embodiments, the first information includes the configured maximum transmit power value on the first link.

In one embodiment, the first parameter indicates a specific value between a configured maximum transmit power value on the first link and a current transmit power value on the first link.

In one embodiment, the first parameter indicates a specific value between a configured maximum transmit power value on the first link and an expected maximum transmit power value on the first link.

In one embodiment, the first parameter indicates a specific value between a configured maximum transmit power value on the first link and a transmit power value on the first link estimated by the first node.

In one subembodiment of the above three embodiments, the configured maximum transmit power value on the first link is in unit of mW; the current transmit power value on the first link is in unit of mW, or the expected maximum transmit power value on the first link is in unit of mW, or the estimated transmit power value on the first link is in unit of mW.

In one embodiment, the first parameter requests to increase the configured maximum transmit power value on the first link.

In one embodiment, the first parameter requests to decrease the configured maximum transmit power value on the first link.

In one embodiment, the first parameter requests to adjust the configured maximum transmit power value on the first link.

In one embodiment, the transmit power of radio signal on the first link cannot be greater than the first parameter.

In one embodiment, the transmit power of radio signal on the first link is lower than the first parameter.

In one embodiment, the transmit power of radio signal on the first link is equal to the first parameter.

In one embodiment, the first parameter is used for indicating the maximum transmit power of radio signal on the first link for the first node.

In one embodiment, the first parameter is in unit of dBm.

In one embodiment, the first parameter is in unit of mW.

In one embodiment, the first radio signal includes a reference signal.

In one embodiment, the first radio signal includes a Physical Sidelink Control Channel (PSCCH).

In one embodiment, the first radio signal includes a Physical Sidelink Shared Channel (PSSCH).

In one embodiment, the first radio signal includes a Physical Sidelink Broadcast Channel (PSBCH).

In one embodiment, the first radio signal includes a Physical Sidelink Discovery Channel (PSDCH).

In one embodiment, the first radio signal includes a Physical Sidelink Feedback Channel (PSFCH).

In one embodiment, the first radio signal includes at least one of a Primary Sidelink Synchronization Signal (PSSS) and a Secondary Sidelink Synchronization Signal (SSSS).

In one embodiment, the channel quality of the first link includes a pathloss.

In one embodiment, the channel quality of the first link includes a distance from a transmitter of the current first radio signal on the first link to the first node.

In one embodiment, the channel quality of the first link includes a Reference Signal Receiver Power (RSRP).

In one embodiment, the channel quality of the first link includes a Reference Signal Receiver Quality (RSRQ).

In one embodiment, the channel quality of the first link includes a Signal-to-Interference plus Noise Ratio (SINR).

In one embodiment, the first radio signal includes a Hybrid Automatic Repeat request Acknowledgement (HARQ-ACK), and the channel quality of the first link includes a Block Error Rate (BLER).

In one embodiment, the first radio signal includes Transmission Power Control (TPC) related information, and the channel quality of the first link includes a transmit power of the first node expected by a transmitter of the first radio signal.

In one embodiment, the second radio signal includes a reference signal.

In one embodiment, the channel quality of the second link includes a pathloss.

In one embodiment, the channel quality of the second link includes an RSRP.

In one embodiment, the channel quality of the second link includes an RSRQ.

In one embodiment, the channel quality of the second link includes an SINR.

In one embodiment, the channel quality of the second link includes a distance from a transmitter of the current second radio signal on the second link to the first node.

In one embodiment, a physical layer channel occupied by the first information includes a Physical Uplink Shared Channel (PUSCH).

In one embodiment, the first information is one Medium Access Control Control Element (MAC CE).

In one embodiment, the above phrase that the first parameter is applied only to the first link of the first link and the second link includes: the first parameter is not applied to determining a transmit power value of a radio signal on the second link.

In one embodiment, the above phrase that the first parameter is applied only to the first link of the first link and the second link includes: the first parameter is applied to determining a transmit power value of a radio signal on the first link only.

In one embodiment, the phrase that the trigger condition is met includes: the channel quality of the second link has a value of degradation greater than a second specific value.

In one subembodiment, the phrase that the channel quality of the second link has a value of degradation greater than a second specific value means: the channel quality of the second link refers to a pathloss, a pathloss determined before the first node receives the second radio signal is K1 (dB), a pathloss determined after the first node receives the second radio signal is K2 (dB), the K1 is less than the K2, and a difference between the K2 and the K1 is greater than the second specific threshold.

In one subembodiment, the phrase that the channel quality of the second link has a value of degradation greater than a second specific value means: the channel quality of the second link refers to an RSRP, an RSRP determined before the first node receives the second radio signal is K1 (dBm), an RSRP determined after the first node receives the second radio signal is K2 (dBm), the K1 is greater than the K2, and a difference between the K1 and the K2 is greater than the second specific threshold.

In one subembodiment, the phrase that the channel quality of the second link has a value of degradation greater than a second specific value means: the channel quality of the second link refers to an RSRQ, an RSRQ determined before the first node receives the second radio signal is K1 (dB), an RSRQ determined after the first node receives the second radio signal is K2 (dB), the K1 is greater than the K2, and a difference between the K1 and the K2 is greater than the second specific threshold.

In one subembodiment, the phrase that the channel quality of the second link has a value of degradation greater than a second specific value means: the channel quality of the second link refers to a distance from a transmitter of the second radio signal to the first node, a distance from a transmitter of the second radio signal to the first node estimated before the first node receives the second radio signal is K1 (m), a distance from a transmitter of the second radio signal to the first node estimated after the first node receives the second radio signal is K2 (m), the K1 is less than the K2, and a difference between the K2 and the K1 is greater than the second specific threshold.

In one subembodiment, the second specific threshold is in unit of dB.

In one subembodiment, the second specific threshold is in unit of meter.

In one embodiment, the above phrase that the trigger condition is met includes: the channel quality of the first link has a value of degradation greater than a first specific value.

In one subembodiment, the above phrase that the channel quality of the first link has a value of degradation greater than a first specific value means: the channel quality of the first link refers to a pathloss, a pathloss determined before the first node receives the first radio signal is Q1 (dB), a pathloss determined after the first node receives the first radio signal is Q2 (dB), the Q1 is less than the Q2, and a difference between the Q2 and the Q1 is greater than the first specific threshold.

In one subembodiment, the above phrase that the channel quality of the first link has a value of degradation greater than a first specific value means: the channel quality of the first link refers to an RSRP, an RSRP determined before the first node receives the first radio signal is Q1 (dBm), an RSRP determined after the first node receives the first radio signal is Q2 (dBm), the Q1 is greater than the Q2, and a difference between the Q1 and the Q2 is greater than the first specific threshold.

In one subembodiment, the above phrase that the channel quality of the first link has a value of degradation greater than a first specific value means: the channel quality of the first link refers to an RSRQ, an RSRQ determined before the first node receives the first radio signal is Q1 (dB), an RSRQ determined after the first node receives the first radio signal is Q2 (dB), the Q1 is greater than the Q2, and a difference between the Q1 and the Q2 is greater than the first specific threshold.

In one subembodiment, the above phrase that the channel quality of the first link has a value of degradation greater than a first specific value means: the channel quality of the first link refers to a distance from a transmitter of the first radio signal to the first node, a distance from a transmitter of the first radio signal to the first node estimated before the first node receives the first radio signal is Q1 (m), a distance from a transmitter of the first radio signal to the first node estimated after the first node receives the first radio signal is Q2 (m), the Q1 is less than the Q2, and a difference between the Q2 and the Q1 is greater than the first specific threshold.

In one subembodiment, the first specific threshold is in unit of dB.

In one subembodiment, the first specific threshold is in unit of meter.

In one subembodiment, the first specific threshold is predefined.

In one subembodiment, the second specific threshold is predefined.

In one subembodiment, the first specific threshold is configured through an RRC signaling.

In one subembodiment, the second specific threshold is configured through an RRC signaling.

Embodiment 2

Figure 2:
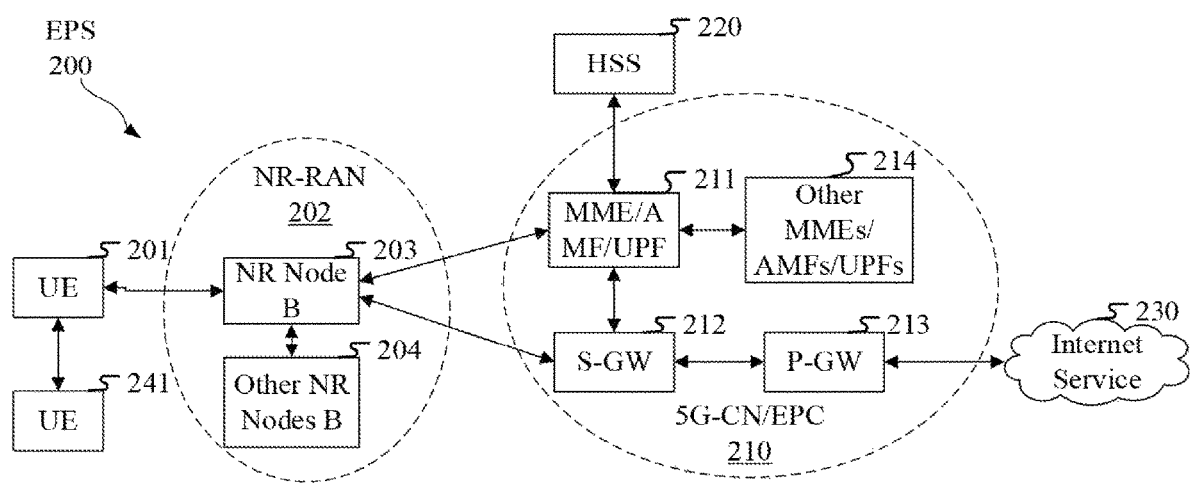
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, and include one UE 241 in sidelink communication with the UE 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial base station communication, satellite mobile communication, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobiles, vehicles or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the gNB 203 corresponds to the second node in the disclosure.

In one embodiment, the UE 241 corresponds to the third node in the disclosure.

In one embodiment, an air interface between the UE 201 and the gNB 203 is a Uu interface.

In one embodiment, an air interface between the UE 201 and the UE 241 is a PC5 interface.

In one embodiment, a wireless link between the UE 201 and the gNB 203 is a cellular link.

In one embodiment, a wireless link between the UE 201 and the UE 241 is a sidelink.

In one embodiment, the first node in the disclosure is the UE 201, and the third node in the disclosure is one terminal in the coverage of the gNB 203.

In one embodiment, the first node in the disclosure is the UE 201, and the third node in the disclosure is one terminal out of the coverage of the gNB 203.

In one embodiment, the first node and the third node in the disclosure are both served by the second node.

In one embodiment, the first node and the third node belong to one terminal group.

In one embodiment, the first node is one car.

In one embodiment, the third node is one car.

In one embodiment, the first node is one transportation tool.

In one embodiment, the third node is one transportation tool.

In one embodiment, the second node is one base station.

In one embodiment, the first node is one Road Side Unit (RSU).

In one embodiment, the third node is one RSU.

Embodiment 3

Figure 3:
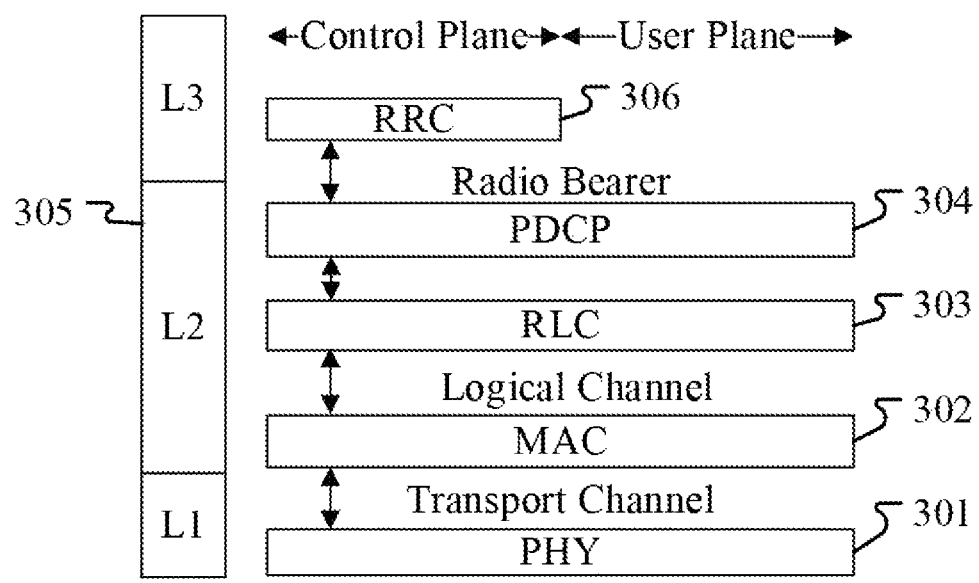
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture of a first node and a second node is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first node and the second node over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated on the second node on the network side. Although not shown in FIG. 3, the first node may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for handover of the first communication node between second nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in a cell among first nodes. The MAC sublayer 302 is also in charge of HARQ operations. In the control plane, the radio protocol architecture of the first node and the second node is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the first node and the second node.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the third node in the disclosure.

In one embodiment, the first information in the disclosure is generated on the RRC sublayer 306.

In one embodiment, the first information in the disclosure is generated on the PHY 301.

In one embodiment, the first information in the disclosure is generated on the MAC sublayer 302.

In one embodiment, the first radio signal in the disclosure is generated on the PHY 301.

In one embodiment, the first radio signal in the disclosure is generated on the MAC sublayer 302.

In one embodiment, the second radio signal in the disclosure is generated on the PHY 301.

In one embodiment, the second radio signal in the disclosure is generated on the MAC sublayer 302.

In one embodiment, any one of the K1 first-type radio signals in the disclosure is generated on the PHY 301.

In one embodiment, any one of the K1 first-type radio signals in the disclosure is generated on the MAC sublayer 302.

In one embodiment, the second information in the disclosure is generated on the RRC sublayer 306.

In one embodiment, the second information in the disclosure is generated on the MAC sublayer 302.

In one embodiment, the second information in the disclosure is generated on the PHY sublayer 301.

Embodiment 4

Figure 4:
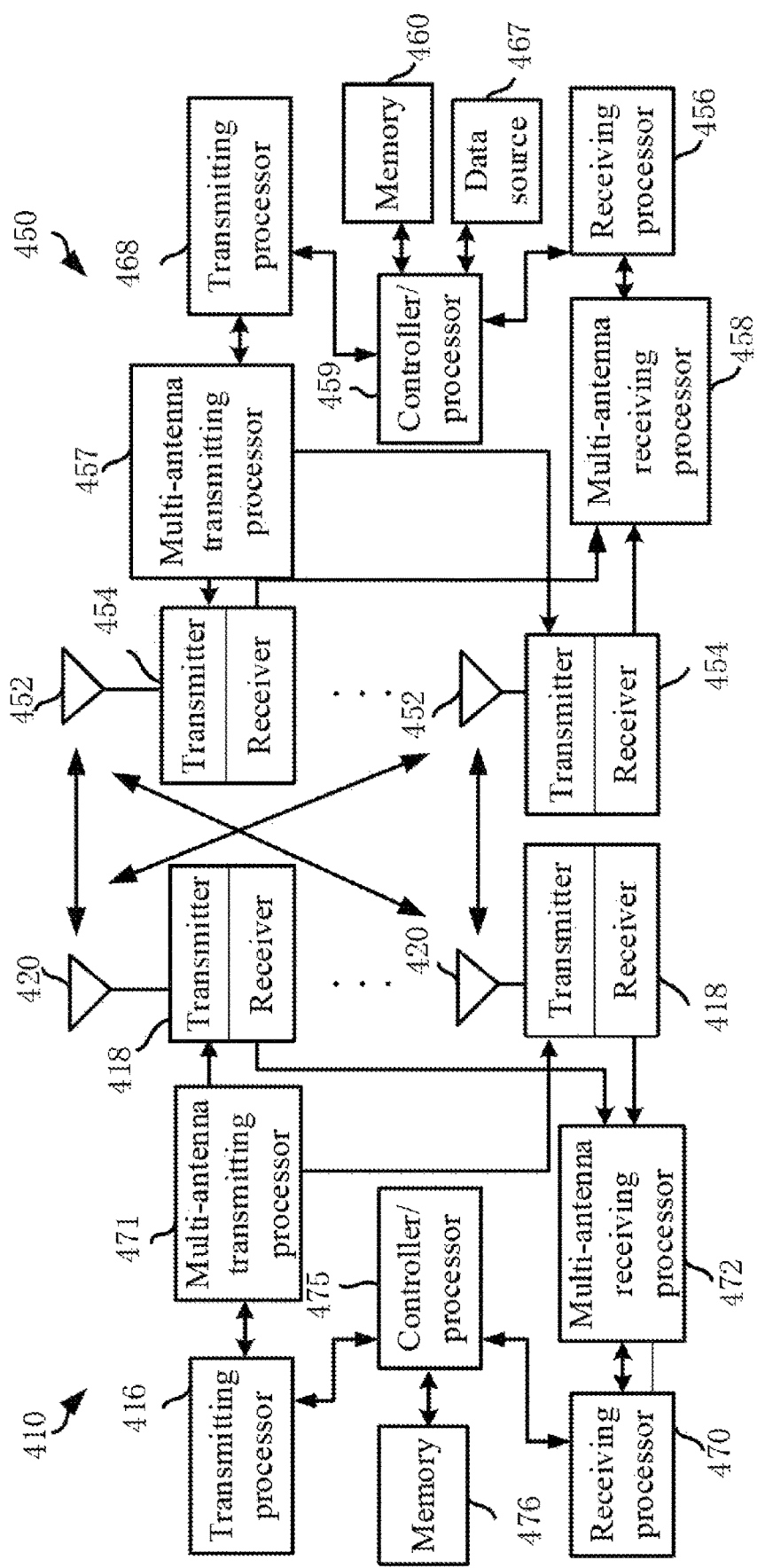
FIG. 4 is a diagram illustrating a first communication equipment and a second equipment according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In a transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 side and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 456 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the first communication equipment 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In a transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on the radio resource allocation so as to provide the functions of Layer 2 used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multi-carrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from the second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In a transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the first communication equipment 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first radio signal and a second radio signal, and transmits first information when a trigger condition is met; the first radio signal and the second radio signal are used for determining a channel quality of a first link and a channel quality of a second link respectively, the channel quality of the first link and the channel quality of the second link are used together for determining the trigger condition; the first information includes a first parameter, and the first parameter is applied only to the first link of the first link and the second link.

In one embodiment, the first communication equipment 450 includes a memory that stores a computer readable instruction program. The computer readable instruction program generates an action when executed by at least one processor. The action includes: receiving a first radio signal and a second radio signal, and transmitting first information when a trigger condition is met; the first radio signal and the second radio signal are used for determining a channel quality of a first link and a channel quality of a second link respectively, the channel quality of the first link and the channel quality of the second link are used together for determining the trigger condition; the first information includes a first parameter, and the first parameter is applied only to the first link of the first link and the second link.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a second radio signal and receives first information; a first radio signal and the second radio signal are used for determining a channel quality of a first link and a channel quality of a second link respectively, the channel quality of the first link and the channel quality of the second link are used together for determining a trigger condition; a transmitter of the first information transmits the first information when the trigger condition is met; the first information includes a first parameter, and the first parameter is applied only to the first link of the first link and the second link.

In one embodiment, the second communication equipment 410 includes a memory that stores a computer readable instruction program. The computer readable instruction program generates an action when executed by at least one processor. The action includes: transmitting a second radio signal and receiving first information; a first radio signal and the second radio signal are used for determining a channel quality of a first link and a channel quality of a second link respectively, the channel quality of the first link and the channel quality of the second link are used together for determining a trigger condition; a transmitter of the first information transmits the first information when the trigger condition is met; the first information includes a first parameter, and the first parameter is applied only to the first link of the first link and the second link.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first radio signal; the first radio signal and a second radio signal are used for determining a channel quality of a first link and a channel quality of a second link respectively, the channel quality of the first link and the channel quality of the second link are used together for determining a trigger condition; a transmitter of first information transmits the first information when the trigger condition is met; the first information includes a first parameter, and the first parameter is applied only to the first link of the first link and the second link; and a receiver of the first radio signal includes a transmitter of the first information.

In one embodiment, the second communication equipment 410 includes a memory that stores a computer readable instruction program. The computer readable instruction program generates an action when executed by at least one processor. The action includes: transmitting a first radio signal; the first radio signal and a second radio signal are used for determining a channel quality of a first link and a channel quality of a second link respectively, the channel quality of the first link and the channel quality of the second link are used together for determining a trigger condition; a transmitter of first information transmits the first information when the trigger condition is met; the first information includes a first parameter, and the first parameter is applied only to the first link of the first link and the second link; and a receiver of the first radio signal includes a transmitter of the first information.

In one embodiment, the first communication equipment 450 corresponds to the first node in the disclosure.

In one embodiment, the second communication equipment 410 corresponds to the second node in the disclosure.

In one embodiment, the second communication equipment 410 corresponds to the third node in the disclosure.

In one embodiment, the first communication equipment 450 is one UE.

In one embodiment, the second communication equipment 410 is one UE.

In one embodiment, the second communication equipment 410 is one base station.

In one embodiment, at least one of the antenna 452, the receiver 454, the multi-antenna receiving processor 458, the receiving processor 456 or the controller/processor 459 is used for receiving a first radio signal; and at least one of the antenna 420, the transmitter 418, the multi-antenna transmitting processor 471, the transmitting processor 416 or the controller/processor 475 is used for transmitting a first radio signal.

In one embodiment, at least one of the antenna 452, the receiver 454, the multi-antenna receiving processor 458, the receiving processor 456 or the controller/processor 459 is used for receiving a second radio signal; and at least one of the antenna 420, the transmitter 418, the multi-antenna transmitting processor 471, the transmitting processor 416 or the controller/processor 475 is used for transmitting a second radio signal.

In one embodiment, at least one of the antenna 452, the transmitter 454, the multi-antenna transmitting processor 457, the transmitting processor 468 or the controller/processor 459 is used for transmitting first information; and at least one of the antenna 420, the receiver 418, the multi-antenna receiving processor 472, the receiving processor 470 or the controller/processor 475 is used for receiving first information.

In one embodiment, at least one of the antenna 452, the receiver 454, the multi-antenna receiving processor 458, the receiving processor 456 or the controller/processor 459 is used for receiving K1 first-type radio signals; and at least one of the antenna 420, the transmitter 418, the multi-antenna transmitting processor 471, the transmitting processor 416 or the controller/processor 475 is used for transmitting K1 first-type radio signals.

In one embodiment, at least one of the antenna 452, the receiver 454, the multi-antenna receiving processor 458, the receiving processor 456 or the controller/processor 459 is used for receiving second information; and at least one of the antenna 420, the transmitter 418, the multi-antenna transmitting processor 471, the transmitting processor 416 or the controller/processor 475 is used for transmitting second information.

In one embodiment, at least one of the transmitter 454, the multi-antenna transmitting processor 457, the transmitting processor 468 or the controller/processor 459 is used for determining a first power value and a second power value.

Embodiment 5

Figure 5:
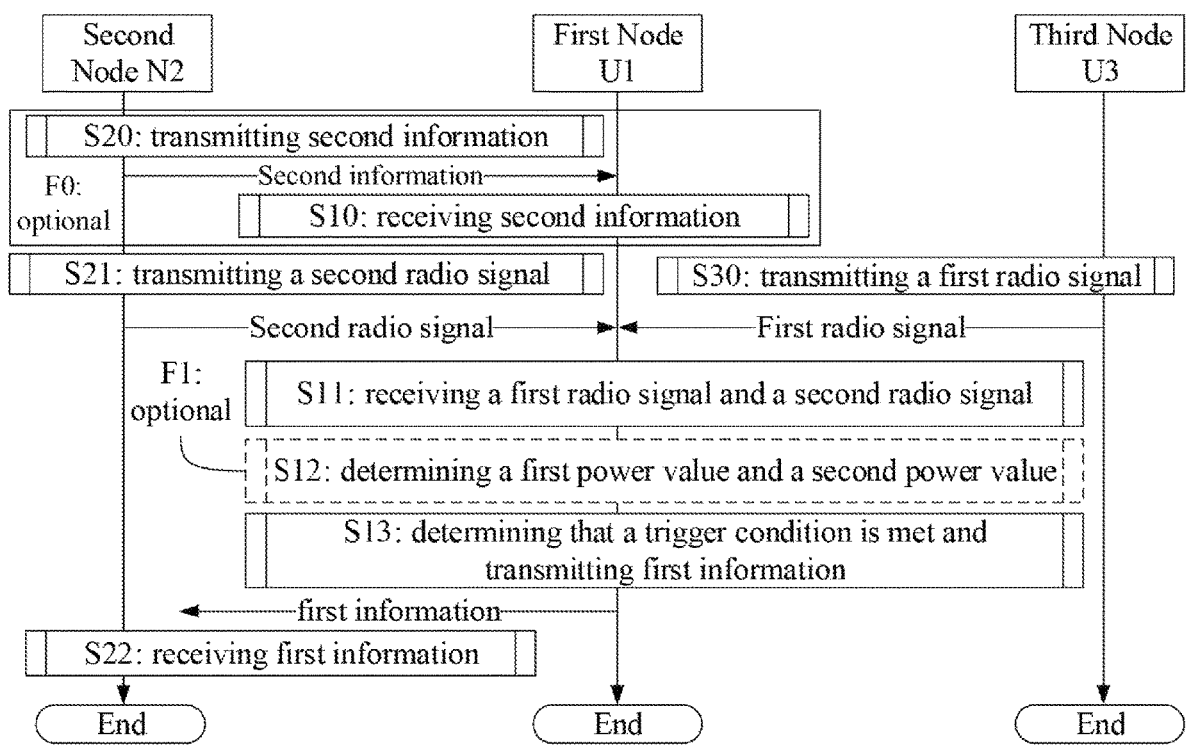
FIG. 5 is a flowchart of first information according to one embodiment of the disclosure.

Embodiment 5 illustrates an example of a flowchart of first information, as shown in FIG. 5. In FIG. 5, a first node U1 and a second node N2 perform communication via an air interface, the first node U1 and a third node U3 also perform communication via an air interface. Steps in boxes F0 and F1 shown in FIG. 5 are optional.

The first node U1 receives second information in S10, receives a first radio signal and a second radio signal in S11, determines a first power value and a second power value in S12, and determines that a trigger condition is met and transmits first information in S13.

The second node N2 transmits second information in S20, transmits a second radio signal in S21 and receives first information in S22.

The third node U3 transmits a first radio signal in S30.

In Embodiment 5, the first radio signal and the second radio signal are used for determining a channel quality of a first link and a channel quality of a second link respectively, the channel quality of the first link and the channel quality of the second link are used together for determining the trigger condition; the first information includes a first parameter, and the first parameter is applied only to the first link of the first link and the second link; the first link corresponds to a first maximum power value, a difference between the first maximum power value and the first power value is equal to the first parameter, and the channel quality of the first link is used for determining the first power value; the second link corresponds to a second maximum power value, a difference between the second maximum power value and the second power value is equal to a second parameter, and the channel quality of the second link is used for determining the second power value; the first information includes the second parameter; and the second information includes at least one of the first maximum power value and the first timer.

In one embodiment, the phrase that the trigger condition is met includes: a change in the channel quality of the second link is greater than a second specific threshold.

In one subembodiment, the above phrase that a change in the channel quality of the second link is greater than a second specific threshold means: the channel quality of the second link refers to a pathloss, a pathloss determined before the first node U1 receives the second radio signal is L1 (dB), a pathloss determined after the first node U1 receives the second radio signal is L2 (dB), and an absolute value of a difference between the L1 and the L2 is greater than the second specific threshold.

In one subembodiment, the above phrase that a change in the channel quality of the second link is greater than a second specific threshold means: the channel quality of the second link refers to an RSRP, an RSRP determined before the first node U1 receives the second radio signal is L1 (dBm), an RSRP determined after the first node U1 receives the second radio signal is L2 (dBm), and an absolute value of a difference between the L1 and the L2 is greater than the second specific threshold.

In one subembodiment, the above phrase that a change in the channel quality of the second link is greater than a second specific threshold means: the channel quality of the second link refers to an RSRQ, an RSRQ determined before the first node U1 receives the second radio signal is L1 (dB), an RSRQ determined after the first node U1 receives the second radio signal is L2 (dB), and an absolute value of a difference between the L1 and the L2 is greater than the second specific threshold.

In one subembodiment, the above phrase that a change in the channel quality of the second link is greater than a second specific threshold means: the channel quality of the second link refers to a distance from a transmitter of the second radio signal to the first node U1, a distance from the second node N2 to the first node U1 estimated before the first node U1 receives the second radio signal is L1 (m), a distance from the second node N2 to the first node U1 estimated after the first node U1 receives the second radio signal is L2 (m), and an absolute value of a difference between the L1 and the L2 is greater than the second specific threshold.

In one embodiment, the phrase that the trigger condition is met includes: a change in the channel quality of the first link is greater than a first specific threshold.

In one subembodiment, the first parameter indicates the change of the channel quality of the first link.

In one subembodiment, the above phrase that a change in the channel quality of the first link is greater than a first specific threshold means: the channel quality of the first link refers to a pathloss, a pathloss determined before the first node U1 receives the first radio signal is L1 (dB), a pathloss determined after the first node U1 receives the first radio signal is L2 (dB), and an absolute value of a difference between the L1 and the L2 is greater than the first specific threshold.

In one subembodiment, the above phrase that a change in the channel quality of the first link is greater than a first specific threshold means: the channel quality of the first link refers to an RSRP, an RSRP determined before the first node U1 receives the first radio signal is L1 (dBm), an RSRP determined after the first node U1 receives the first radio signal is L2 (dBm), and an absolute value of a difference between the L1 and the L2 is greater than the first specific threshold.

In one subembodiment, the above phrase that a change in the channel quality of the first link is greater than a first specific threshold means: the channel quality of the first link refers to an RSRQ, an RSRQ determined before the first node U1 receives the first radio signal is L1 (dB), an RSRQ determined after the first node U1 receives the first radio signal is L2 (dB), and an absolute value of a difference between the L1 and the L2 is greater than the first specific threshold.

In one subembodiment, the above phrase that a change in the channel quality of the first link is greater than a first specific threshold means: the channel quality of the first link refers to a distance from the third node U3 to the first node, a distance from the third node U3 to the first node U1 estimated before the first node U1 receives the first radio signal is L1 (m), a distance from the third node U3 to the first node U1 estimated after the first node U1 receives the first radio signal is L2 (m), and an absolute value of a difference between the L1 and the L2 is greater than the first specific threshold.

In one embodiment, the first link corresponds to a first timer, the second link corresponds to a second timer, and both the first timer and the second timer have expired when the first node U1 transmits the first information.

In one subembodiment, the first timer is configured through an RRC signaling.

In one subembodiment, the second timer is configured through an RRC signaling.

In one subembodiment, the first timer is the first link specific.

In one subembodiment, the second timer is the second link specific.

In one subembodiment, the first timer is used for the sidelink.

In one subembodiment, the first timer is used for the cellular link.

In one embodiment, the first radio signal is one of K1 first-type radio signals, the K1 first-type radio signals are used for determining K1 first-type channel qualities respectively, and the channel quality of the first link is one of the K1 first-type channel qualities.

In one subembodiment, the K1 first-type channel qualities are transmitted by K1 terminals respectively.

In one affiliated embodiment of the above subembodiment, the K1 terminals belong to one same terminal group.

In one affiliated embodiment of the above subembodiment, the K1 terminals belong to K1 terminal groups respectively, and the K1 terminals are group heads of the K1 terminal groups respectively.

In one affiliated embodiment of the above subembodiment, the K1 terminals belong to K1 terminal groups respectively, and the K1 terminals are group managers of the K1 terminal groups respectively.

In one subembodiment, any one of the K1 first-type radio signals includes a reference signal.

In one subembodiment, the K1 first-type channel qualities are K1 pathlosses obtained according to the K1 first-type radio signals respectively, and the channel quality of the first link is a maximum one of the K1 pathlosses.

In one subembodiment, the K1 first-type channel qualities are K1 RSRPs obtained according to the K1 first-type radio signals respectively, and the channel quality of the first link is a minimum one of the K1 RSRPs.

In one subembodiment, the K1 first-type channel qualities are K1 RSRQs obtained according to the K1 first-type radio signals respectively, and the channel quality of the first link is a minimum one of the K1 RSRQs.

In one subembodiment, the K1 first-type channel qualities are K1 distances obtained according to the K1 first-type radio signals respectively, and the channel quality of the first link is a maximum one of the K1 distances.

In one subembodiment, the K1 first-type channel qualities are K1 pathloss change values obtained according to the K1 first-type radio signals respectively, and the channel quality of the first link is a channel quality obtained on the first-type radio signal corresponding to a maximum one of the K1 pathloss change values.

In one subembodiment, the K1 first-type channel qualities are K1 RSRP change values obtained according to the K1 first-type radio signals respectively, and the channel quality of the first link is a channel quality obtained on the first-type radio signal corresponding to a maximum one of the K1 RSRP change values.

In one subembodiment, the K1 first-type channel qualities are K1 RSRQ change values obtained according to the K1 first-type radio signals respectively, and the channel quality of the first link is a channel quality obtained on the first-type radio signal corresponding to a maximum one of the K1 RSRQ change values.

In one subembodiment, the K1 first-type channel qualities are K1 distance change values obtained according to the K1 first-type radio signals respectively, and the channel quality of the first link is a channel quality obtained on the first-type radio signal corresponding to a maximum one of the K1 distance change values.

In one embodiment, the first maximum power value is in unit of dBm.

In one embodiment, the first maximum power value is configured through an RRC signaling.

In one embodiment, the first maximum power value is configured through an MAC CE.

In one embodiment, the first maximum power value is configured through a physical layer dynamic signaling.

In one embodiment, the first power value is the power value to be employed by the first node U1 to perform radio transmission on the first link.

In one embodiment, the first power value is the power value recently employed by the first node U1 to perform radio transmission on the first link.

In one embodiment, the second maximum power value is in unit of dBm.

In one embodiment, the second maximum power value is configured through an RRC signaling.

In one embodiment, the second maximum power value is configured through an MAC CE.

In one embodiment, the second maximum power value is configured through a physical layer dynamic signaling.

In one embodiment, the second power value is the power value to be employed by the first node U1 to perform radio transmission on the second link.

In one embodiment, the second power value is the power value recently employed by the first node U1 to perform radio transmission on the second link.

In one embodiment, the first information includes both the first parameter and the second parameter.

In one embodiment, the second parameter is a PHR for the second link.

In one embodiment, the first parameter and the second parameter have fixed positions in the first information.

In one embodiment, the first information includes a first identifier and a second identifier, the first identifier and the second identifier are used for indicating the first parameter and the second parameter respectively.

In one embodiment, the first information includes the second maximum power value.

In one embodiment, the second information includes the first maximum power value.

In one embodiment, the second information includes the first timer.

In one embodiment, the second information includes the first maximum power value and the first timer.

In one embodiment, the second information includes the second maximum power value.

In one embodiment, the second information includes the second timer.

In one embodiment, the second information is an RRC signaling.

In one embodiment, the second information includes a PHR-Config in TS 38.331.

In one embodiment, the first timer in the disclosure is a phr-PeriodicTimer for the sidelink, and the phr-PeriodicTimer can refer to TS 38.331.

In one embodiment, the first timer in the disclosure is a phr-ProhibitTimer for the sidelink, and the phr-ProhibitTimer can refer to TS 38.331.

In one embodiment, the second timer in the disclosure is a phr-PeriodicTimer for the cellular link, and the phr-PeriodicTimer can refer to TS 38.331.

In one embodiment, the second timer in the disclosure is a phr-ProhibitTimer for the cellular link, and the phr-ProhibitTimer can refer to TS 38.331.

Embodiment 6

Figure 6:
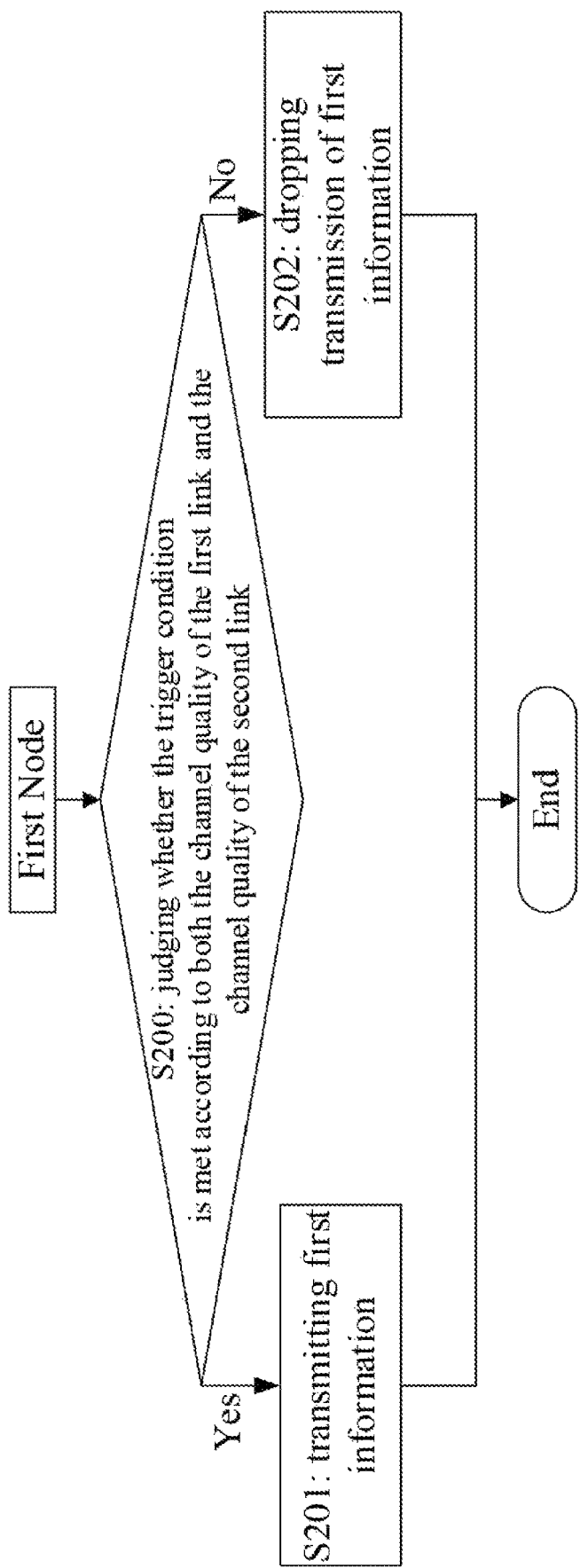
FIG. 6 is a flowchart of determining whether a trigger condition is met according to one embodiment of the disclosure.

Embodiment 6 illustrates an example of a flowchart of determining whether a trigger condition is met, as shown in FIG. 6. In FIG. 6, a first node U1 executes the following steps to determine whether a trigger condition is met and whether to transmit the first information in the disclosure.

In S200, judging whether the trigger condition is met according to both the channel quality of the first link and the channel quality of the second link.

If the trigger condition is met, transmitting first information in S201.

If the trigger condition is not met, dropping transmission of the first information in S202.

In one embodiment, a change in the channel quality of the second link is greater than the second specific threshold in the disclosure, and a change in the channel quality of the first link is greater than the first specific threshold in the disclosure, then the trigger condition is met.

In one embodiment, a degradation in the channel quality of the second link is greater than the second specific threshold in the disclosure, and a degradation in the channel quality of the first link is greater than the first specific threshold in the disclosure, then the trigger condition is met.

In one embodiment, a degradation in the channel quality of the second link is greater than the second specific threshold in the disclosure, and an improvement in the channel quality of the first link is greater than the first specific threshold in the disclosure, then the trigger condition is met.

In one embodiment, an improvement in the channel quality of the second link is greater than the second specific threshold in the disclosure, and a degradation in the channel quality of the first link is greater than the first specific threshold in the disclosure, then the trigger condition is met.

In one embodiment, an improvement in the channel quality of the second link is greater than the second specific threshold in the disclosure, and an improvement in the channel quality of the first link is greater than the first specific threshold in the disclosure, then the trigger condition is met.

Embodiment 7

Figure 7:
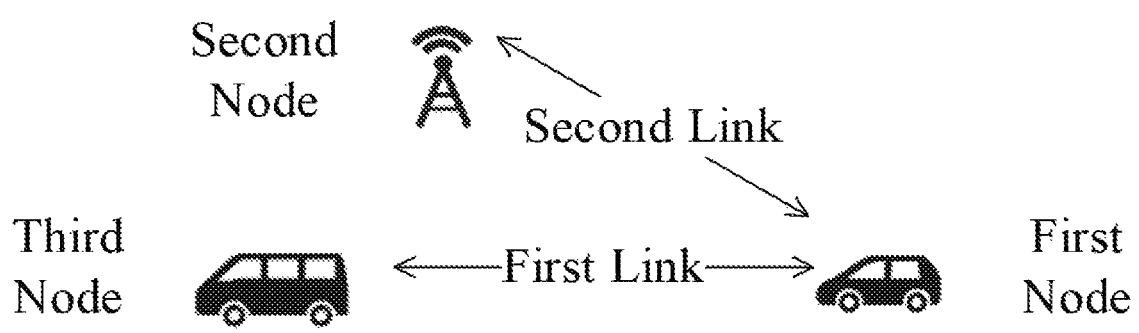
FIG. 7 is diagram of a first node, a second node and a third node according to the disclosure.

Embodiment 7 illustrates an example of a diagram of a first node, a second node and a third node, as shown in FIG. 7. In FIG. 7, the first node and the third node form one V2X pair, and the first node performs cellular communication with the second node; a radio link between the first node and the third node corresponds to the first link in the disclosure, and a radio link between the first node and the second node corresponds to the second link in the disclosure.

In one embodiment, the second node configures a maximum transmit power value of the first node on the first link.

In one embodiment, a maximum transmit power value of the first node on the first link changes with the change in the pathloss between the first node and the second node.

In one subembodiment, the pathloss between the first node and the second node gets larger, and the maximum transmit power value of the first node on the first link gets higher.

In one subembodiment, the pathloss between the first node and the second node gets smaller, and the maximum transmit power value of the first node on the first link gets lower.

Embodiment 8

Figure 8:
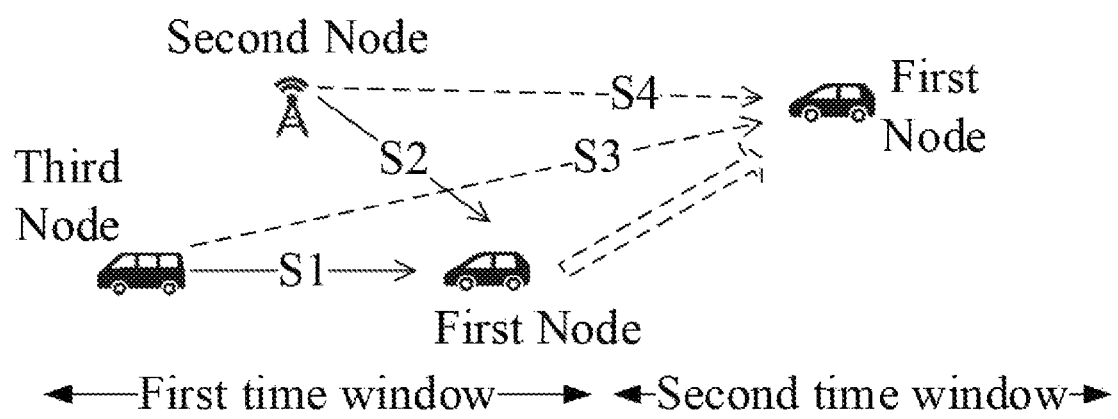
FIG. 8 is a diagram illustrating a case that a trigger condition is met according to the disclosure.

Embodiment 8 illustrates an example of a diagram of a case that a trigger condition is met, as shown in FIG. 8. In FIG. 8, the first node detects in a first time window that a channel quality of a first link is a first channel quality (corresponding to S1 in FIG. 8) and that a channel quality of a second link is a second channel quality (corresponding to S2 in FIG. 8); then, in a second time window, the first node detects according to a first radio signal that a channel quality of the first link is a third channel quality (corresponding to S3 in FIG. 8), and the first node detects according to a second radio signal that a channel quality of the second link is a fourth channel quality (corresponding to S4 in FIG. 8); the third channel quality is lower than the first channel quality, and the fourth channel quality is lower than the second channel quality; and the dashed box arrow represents a movement track of the first node.

In one embodiment, the first channel quality, the second channel quality, the third channel quality and the fourth channel quality are all pathlosses; a difference of the third channel quality minus the first channel quality is greater than a first specific threshold, and a difference of the fourth channel quality minus the second channel quality is greater than a second specific threshold.

In one embodiment, the first channel quality, the second channel quality, the third channel quality and the fourth channel quality are all RSRPs; a difference of the first channel quality minus the third channel quality is greater than a first specific threshold, and a difference of the second channel quality minus the fourth channel quality is greater than a second specific threshold.

In one embodiment, the first channel quality, the second channel quality, the third channel quality and the fourth channel quality are all distances; a difference of the third channel quality minus the first channel quality is greater than a first specific threshold, and a difference of the fourth channel quality minus the second channel quality is greater than a second specific threshold.

Embodiment 9

Figure 9:
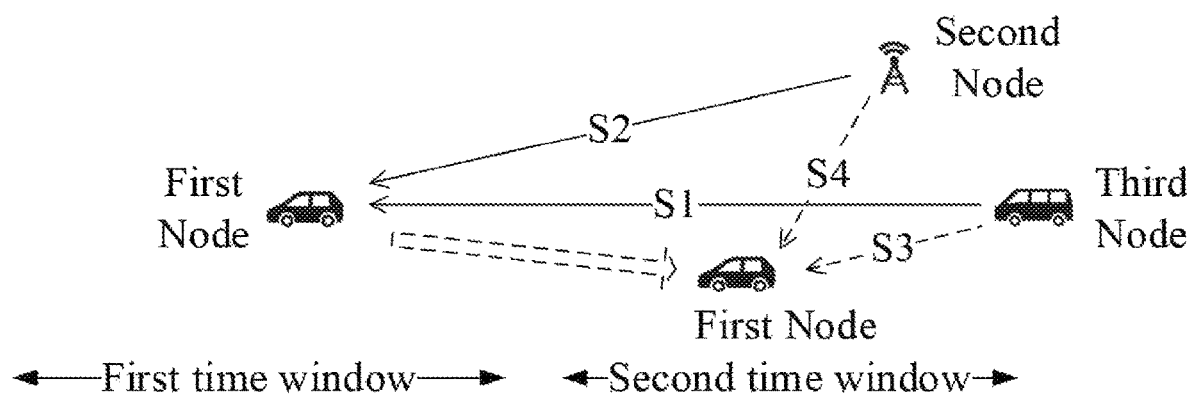
FIG. 9 is another diagram illustrating a case that a trigger condition is met according to the disclosure.

Embodiment 9 illustrates an example of another diagram of a case that a trigger condition is met, as shown in FIG. 9. In FIG. 9, the first node detects in a first time window that a channel quality of a first link is a first channel quality (corresponding to S1 in FIG. 9) and that a channel quality of a second link is a second channel quality (corresponding to S2 in FIG. 9); then, in a second time window, the first node detects according to a first radio signal that a channel quality of the first link is a third channel quality (corresponding to S3 in FIG. 9), and the first node detects according to a second radio signal that a channel quality of the second link is a fourth channel quality (corresponding to S4 in FIG. 9); the third channel quality is higher than the first channel quality, and the fourth channel quality is higher than the second channel quality; and the dashed box arrow represents a movement track of the first node.

In one embodiment, the first channel quality, the second channel quality, the third channel quality and the fourth channel quality are all pathlosses; a difference of the first channel quality minus the third channel quality is greater than a first specific threshold, and a difference of the second channel quality minus the fourth channel quality is greater than a second specific threshold.

In one embodiment, the first channel quality, the second channel quality, the third channel quality and the fourth channel quality are all RSRPs; a difference of the third channel quality minus the first channel quality is greater than a first specific threshold, and a difference of the fourth channel quality minus the second channel quality is greater than a second specific threshold.

In one embodiment, the first channel quality, the second channel quality, the third channel quality and the fourth channel quality are all distances; a difference of the first channel quality minus the third channel quality is greater than a first specific threshold, and a difference of the second channel quality minus the fourth channel quality is greater than a second specific threshold.

Embodiment 10

Figure 10:
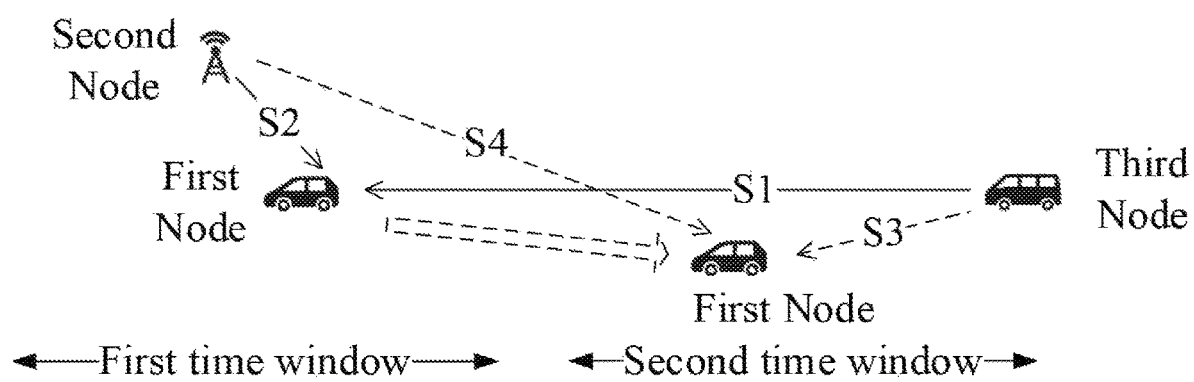
FIG. 10 is another diagram illustrating a case that a trigger condition is met according to the disclosure.

Embodiment 10 illustrates an example of another diagram of a case that a trigger condition is met, as shown in FIG. 10. In FIG. 10, the first node detects in a first time window that a channel quality of a first link is a first channel quality (corresponding to S1 in FIG. 10) and that a channel quality of a second link is a second channel quality (corresponding to S2 in FIG. 10); then, in a second time window, the first node detects according to a first radio signal that a channel quality of the first link is a third channel quality (corresponding to S3 in FIG. 10), and the first node detects according to a second radio signal that a channel quality of the second link is a fourth channel quality (corresponding to S4 in FIG. 10); the third channel quality is higher than the first channel quality, and the fourth channel quality is lower than the second channel quality; and the dashed box arrow represents a movement track of the first node.

In one embodiment, the first channel quality, the second channel quality, the third channel quality and the fourth channel quality are all pathlosses; a difference of the first channel quality minus the third channel quality is greater than a first specific threshold, and a difference of the fourth channel quality minus the second channel quality is greater than a second specific threshold.

In one embodiment, the first channel quality, the second channel quality, the third channel quality and the fourth channel quality are all RSRPs; a difference of the third channel quality minus the first channel quality is greater than a first specific threshold, and a difference of the second channel quality minus the fourth channel quality is greater than a second specific threshold.

In one embodiment, the first channel quality, the second channel quality, the third channel quality and the fourth channel quality are all distances; a difference of the first channel quality minus the third channel quality is greater than a first specific threshold, and a difference of the fourth channel quality minus the second channel quality is greater than a second specific threshold.

Embodiment 11

Figure 11:
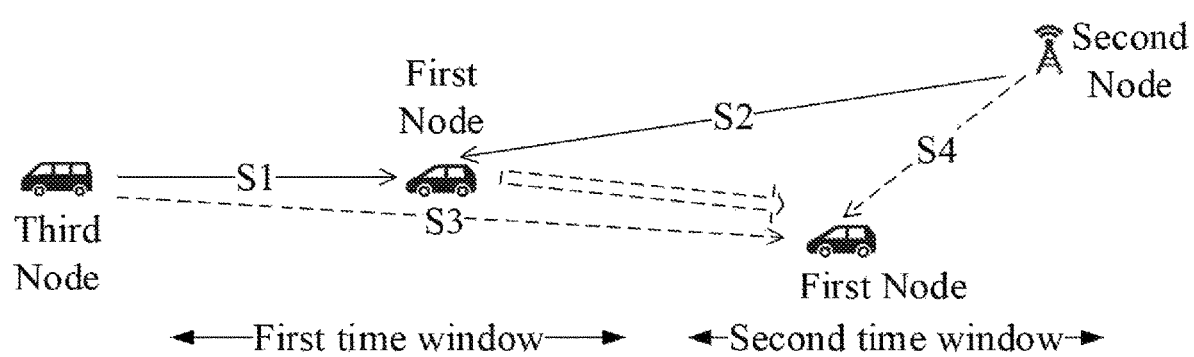
FIG. 11 is another diagram illustrating a case that a trigger condition is met according to the disclosure.

Embodiment 11 illustrates an example of another diagram of a case that a trigger condition is met, as shown in FIG. 11. In FIG. 10, the first node detects in a first time window that a channel quality of a first link is a first channel quality (corresponding to S1 in FIG. 11) and that a channel quality of a second link is a second channel quality (corresponding to S2 in FIG. 11); then, in a second time window, the first node detects according to a first radio signal that a channel quality of the first link is a third channel quality (corresponding to S3 in FIG. 11), and the first node detects according to a second radio signal that a channel quality of the second link is a fourth channel quality (corresponding to S4 in FIG. 11); the third channel quality is lower than the first channel quality, and the fourth channel quality is higher than the second channel quality; and the dashed box arrow represents a movement track of the first node.

In one embodiment, the first channel quality, the second channel quality, the third channel quality and the fourth channel quality are all pathlosses; a difference of the third channel quality minus the first channel quality is greater than a first specific threshold, and a difference of the second channel quality minus the fourth channel quality is greater than a second specific threshold.

In one embodiment, the first channel quality, the second channel quality, the third channel quality and the fourth channel quality are all RSRPs; a difference of the first channel quality minus the third channel quality is greater than a first specific threshold, and a difference of the fourth channel quality minus the second channel quality is greater than a second specific threshold.

In one embodiment, the first channel quality, the second channel quality, the third channel quality and the fourth channel quality are all distances; a difference of the third channel quality minus the first channel quality is greater than a first specific threshold, and a difference of the second channel quality minus the fourth channel quality is greater than a second specific threshold.

Embodiment 12

Figure 12:
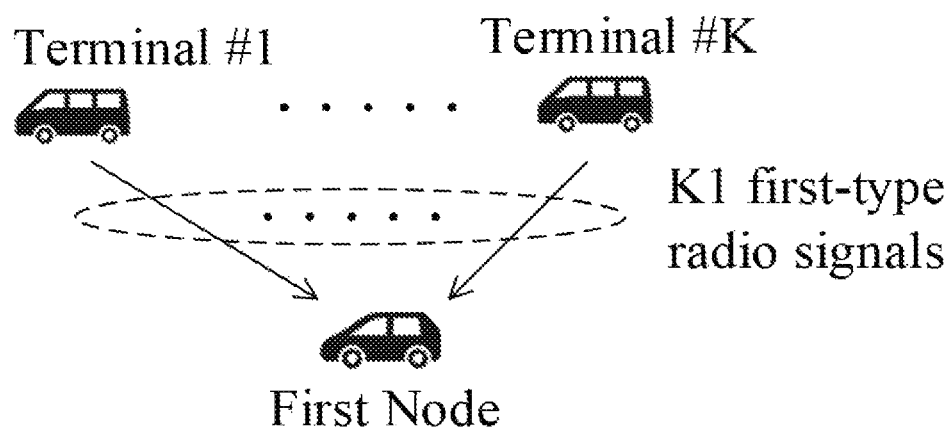
FIG. 12 is a diagram illustrating K1 first-type radio signals according to the disclosure.

Embodiment 12 illustrates an example of a diagram of K1 first-type radio signals, as shown in FIG. 12. In FIG. 12, the K1 first-type radio signals are transmitted by K1 terminals respectively, and the K1 terminals correspond to a terminal #1 to a terminal #K1 shown in FIG. 12 respectively.

In one embodiment, the first node and the K1 terminals form K1 V2X pairs respectively.

In one embodiment, a transmit power value of a radio signal from the first node to any one of the K1 terminals is limited by the first maximum power value in the disclosure.

In one embodiment, the K1 terminals belong to one terminal group.

In one embodiment, a distance between any one of the K1 terminals and the first node is not greater than a first distance threshold but not less than a second distance threshold; both the first distance threshold and the second distance threshold are in unit of meter; the first distance threshold and the second distance threshold are predefined, or the first distance threshold and the second distance threshold are configured through a higher layer signaling.

In one embodiment, a pathloss between any one of the K1 terminals and the first node is not greater than a first pathloss threshold but not less than a second pathloss threshold; both the first pathloss threshold and the second pathloss threshold are in unit of meter; the first pathloss threshold and the second pathloss threshold are predefined, or the first pathloss threshold and the second pathloss threshold are configured through a higher layer signaling.

Embodiment 13

Figure 13:
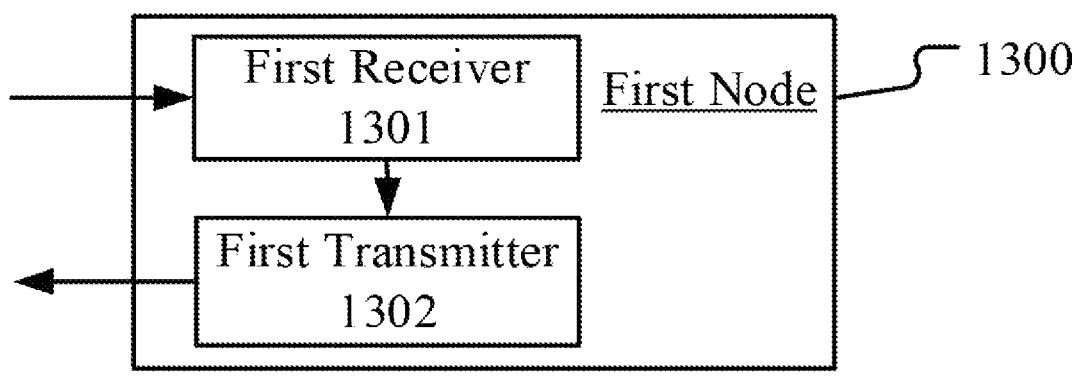
FIG. 13 is a structure block diagram of a first node according to one embodiment of the disclosure.

Embodiment 13 illustrates a structure block diagram of a first node, as shown in FIG. 13. In FIG. 13, a first node 1300 includes a first receiver 1301 and a first transmitter 1302.

The first receiver 1301 receives a first radio signal and a second radio signal.

The first transmitter 1302 transmits first information when a trigger condition is met.

In Embodiment 13, the first radio signal and the second radio signal are used for determining a channel quality of a first link and a channel quality of a second link respectively, the channel quality of the first link and the channel quality of the second link are used together for determining the trigger condition; the first information includes a first parameter, and the first parameter is applied only to the first link of the first link and the second link.

In one embodiment, the phrase that the trigger condition is met includes: a change in the channel quality of the second link is greater than a second specific threshold.

In one embodiment, the phrase that the trigger condition is met includes: a change in the channel quality of the first link is greater than a first specific threshold.

In one embodiment, the first link corresponds to a first timer, the second link corresponds to a second timer, and both the first timer and the second timer have expired when the first node transmits the first information.

In one embodiment, the first radio signal is one of K1 first-type radio signals, the K1 first-type radio signals are used for determining K1 first-type channel qualities respectively, and the channel quality of the first link is one of the K1 first-type channel qualities.

In one embodiment, the first transmitter 1302 determines a first power value and a second power value, the first link corresponds to a first maximum power value, a difference between the first maximum power value and the first power value is equal to the first parameter, and the channel quality of the first link is used for determining the first power value; the second link corresponds to a second maximum power value, a difference between the second maximum power value and the second power value is equal to a second parameter, and the channel quality of the second link is used for determining the second power value; and the first information includes the second parameter.

In one embodiment, the first information includes the first maximum power value.

In one embodiment, the first receiver 1301 receives second information; and the second information includes at least one of the first maximum power value and the first timer.

In one embodiment, the first receiver 1301 includes at least the former four of the antenna 452, the receiver 454, the multi-antenna receiving processor 458, the receiving processor 456 or the controller/processor 459.

In one embodiment, the first transmitter 1302 includes at least the former four of the antenna 452, the transmitter 454, the multi-antenna transmitting processor 457, the transmitting processor 468 or the controller/processor 459.

Embodiment 14

Figure 14:
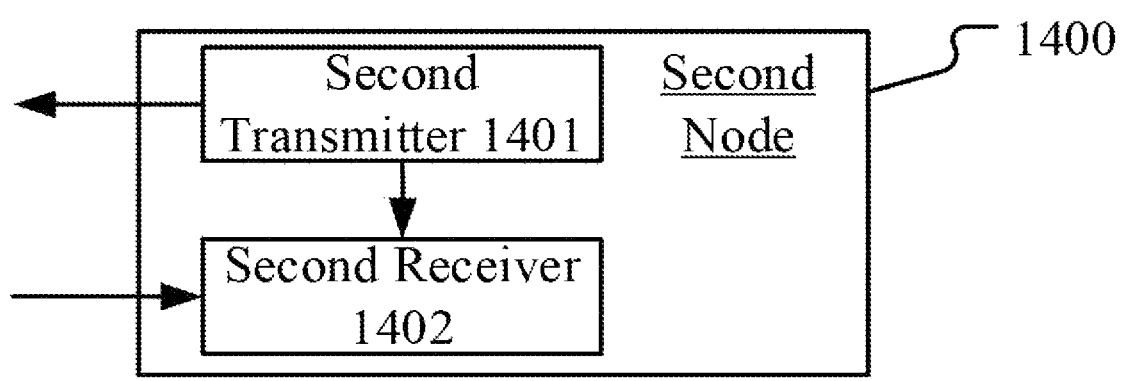
FIG. 14 is a structure block diagram of a second node according to one embodiment of the disclosure.

Embodiment 14 illustrates a structure block diagram of a second node, as shown in FIG. 14. In FIG. 14, a second node 1400 includes a second transmitter 1401 and a second receiver 1402.

The second transmitter 1401 transmits a second radio signal.

The second receiver 1402 receives first information.

In Embodiment 14, a first radio signal and the second radio signal are used for determining a channel quality of a first link and a channel quality of a second link respectively, the channel quality of the first link and the channel quality of the second link are used together for determining a trigger condition; a transmitter of the first information transmits the first information when the trigger condition is met; the first information includes a first parameter, and the first parameter is applied only to the first link of the first link and the second link.

In one embodiment, the phrase that the trigger condition is met includes: a change in the channel quality of the second link is greater than a second specific threshold.

In one embodiment, the phrase that the trigger condition is met includes: a change in the channel quality of the first link is greater than a first specific threshold.

In one embodiment, the first link corresponds to a first timer, the second link corresponds to a second timer, and both the first timer and the second timer have expired when the first node transmits the first information.

In one embodiment, the first radio signal is one of K1 first-type radio signals, the K1 first-type radio signals are used by the transmitter of the first information to determine K1 first-type channel qualities respectively, and the channel quality of the first link is one of the K1 first-type channel qualities.

In one embodiment, the first link corresponds to a first maximum power value, a difference between the first maximum power value and a first power value is equal to the first parameter, and the channel quality of the first link is used by the transmitter of the first information to determine the first power value; the second link corresponds to a second maximum power value, a difference between the second maximum power value and a second power value is equal to a second parameter, and the channel quality of the second link is used by the transmitter of the first information to determine the second power value; and the first information includes the second parameter.

In one embodiment, the first information includes the first maximum power value.

In one embodiment, the second transmitter 1401 transmits second information; the second information includes at least one of the first maximum power value and the first timer.

In one embodiment, the second transmitter 1401 includes at least the former four of the antenna 420, the transmitter 418, the multi-antenna transmitting processor 471, the transmitting processor 416 or the controller/processor 475.

In one embodiment, the second receiver 1402 includes at least the former four of the antenna 420, the receiver 418, the multi-antenna receiving processor 472, the receiving processor 470 or the controller/processor 475.

Embodiment 15

Figure 15:
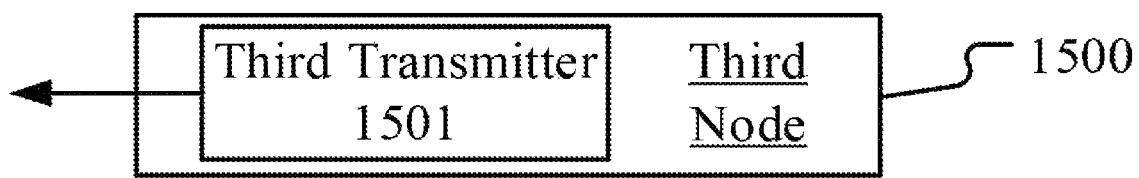
FIG. 15 is a structure block diagram of a third node according to one embodiment of the disclosure.

Embodiment 15 illustrates an example of a structure block diagram of a third node, as shown in FIG. 15. In FIG. 15, a third node 1500 includes a third transmitter 1501.

The third transmitter 1501 transmits a first radio signal.

In Embodiment 15, the first radio signal and a second radio signal are used for determining a channel quality of a first link and a channel quality of a second link respectively, the channel quality of the first link and the channel quality of the second link are used together for determining a trigger condition; a transmitter of first information transmits the first information when the trigger condition is met; the first information includes a first parameter, and the first parameter is applied only to the first link of the first link and the second link; and a receiver of the first radio signal includes a transmitter of the first information.

In one embodiment, the phrase that the trigger condition is met includes: a change in the channel quality of the second link is greater than a second specific threshold.

In one embodiment, the phrase that the trigger condition is met includes: a change in the channel quality of the first link is greater than a first specific threshold.

In one embodiment, the first link corresponds to a first timer, the second link corresponds to a second timer, and both the first timer and the second timer have expired when the first node transmits the first information.

In one embodiment, the first radio signal is one of K1 first-type radio signals, the K1 first-type radio signals are used by a transmitter of the first information to determine K1 first-type channel qualities respectively, and the channel quality of the first link is one of the K1 first-type channel qualities.

In one embodiment, the first link corresponds to a first maximum power value, a difference between the first maximum power value and the first power value is equal to the first parameter, and the channel quality of the first link is used by a transmitter of the first information to determine the first power value; the second link corresponds to a second maximum power value, a difference between the second maximum power value and a second power value is equal to a second parameter, and the channel quality of the second link is used by the transmitter of the first information to determine the second power value; and the first information includes the second parameter;

In one embodiment, the first information includes the first maximum power value.

In one embodiment, the third transmitter 1501 includes at least the former four of the antenna 420, the transmitter 418, the multi-antenna transmitting processor 471, the transmitting processor 416 or the controller/processor 475.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node and the second node in the disclosure include but not limited to mobile phones, tablet computers, notebooks, network cards, low-power equipment, eMTC equipment, NB-IOT equipment, vehicle-mounted communication equipment, transportation tools, vehicles, RSUs, aircrafts, airplanes, unmanned aerial vehicles, telecontrolled aircrafts, and other radio communication equipment. The base station in the disclosure includes but not limited to macro-cellular base stations, micro-cellular base stations, home base stations, relay base stations, eNBs, eNBs, TRPs, GNSSs, relay satellites, satellite base stations, air base stations, RSUs and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first node for wireless communication, comprising:
a first receiver, configured to receive a first radio signal and a second radio signal; and
a first transmitter, configured to transmit first information when a trigger condition is met;
wherein:
the first radio signal and the second radio signal are used for determining a channel quality of a first link between the first node and a third node, and a channel quality of a second link between the first node and a second node, respectively;
the channel quality of the first link and the channel quality of the second link are used for determining the trigger condition;
a first power value for radio transmission on the first link is determined using the channel quality of the first link;
a second power value for radio transmission on the second link is determined using the channel quality of the second link;
the first information comprises a first parameter indicating a difference between a first maximum power value and the first power value, and a second parameter indicating a difference between the second maximum power value and the second power value;
the first maximum power value is configured to limit power values of radio signals transmitted by the first node on the first link; and
the second maximum power value is configured to limit power values of radio signals transmitted by the first node on the second link.

2. The first node according to claim 1, wherein the trigger condition is met when a change in the channel quality of the second link is greater than a second specific threshold and a change in the channel quality of the first link is greater than a first specific threshold.

3. The first node according to claim 1, further comprising a first timer and a second timer configured by Radio Resource Control signalings, respectively timing the first link and the second link; wherein both the first timer and the second timer have expired when the first node transmits the first information.

4. The first node according to claim 1, wherein:
the first radio signal is one of a plurality of first-type radio signals;
the first-type radio signals are used for determining a plurality of first-type channel qualities respectively;
the channel quality of the first link is one of the first-type channel qualities; and
each of the first-type radio signals comprises a reference signal.

5. The first node according to claim 1, wherein the first information comprises the first maximum power value.

6. A base station for wireless communication, comprising:
a transmitter, configured to transmit a radio signal; and
a receiver, configured to receive first information from a first terminal; wherein:
the base station receives the first information when a trigger condition is met, wherein the trigger condition is determined based on a channel quality of a first link between the first terminal and a second terminal, and a channel quality of a second link between the first terminal and the base station;
the channel quality of the first link is determined based on a first radio signal, and is used for determining a first power value for radio transmission on the first link;
the channel quality of the second link is determined based on the radio signal, and is used for determining a second power value for radio transmission on the second link;
the first information comprises a first parameter indicating a difference between a first maximum power value and the first power value, and a second parameter indicating a difference between the second maximum power value and the second power value;
the first maximum power value is configured to limit power values of radio signals transmitted by the first terminal on the first link; and
the second maximum power value is configured to limit power values of radio signals transmitted by the first terminal on the second link.

7. The base station according to claim 6, the trigger condition is met when a change in the channel quality of the second link is greater than a second specific threshold and a change in the channel quality of the first link is greater than a first specific threshold.

8. The base station according to claim 6, wherein:
the base station transmits second information to the first terminal through Radio Resource Control signalings, comprising timer configurations for respectively configuring a first timer of the first link and a second timer of the second link; wherein:
the first radio signal is one of a plurality of first-type radio signals;
the first-type radio signals are used by the first terminal to determine a plurality of first-type channel qualities respectively;
the channel quality of the first link is one of the first-type channel qualities; and
each of the first-type radio signals comprises a reference signal.

9. The base station according to claim 6, wherein the first information comprises the first maximum power value.

10. A method in a first node for wireless communication, comprising:
receiving a first radio signal and a second radio signal; and
respectively determining a channel quality of a first link between the first node and a third node, and a channel quality of a second link between the first node and a second node using the first radio signal and the second radio signal;
determining a trigger condition using the channel quality of the first link and the channel quality of the second link; and
transmitting first information when a trigger condition is met wherein:
the first information comprises a first parameter; indicating a difference between a first maximum power value and the first power value, and a second parameter indicating a difference between a second maximum power value and the second power value;
the first maximum power value is configured to limit power values of radio signals transmitted by the first node on the first link; and the second maximum power value is configured to limit power values of radio signals transmitted by the first node on the second link.

11. The method in the first node according to claim 10, wherein the trigger condition is met when a change in the channel quality of the second link is greater than a second specific threshold and a change in the channel quality of the first link is greater than a first specific threshold.

12. The method in the first node according to claim 10, further comprising configuring a first timer and a second timer by Radio Resource Control signalings—respectively for the first link and the second link; wherein both the first timer and the second timer have expired when the first node transmits the first information.

13. The method in the first node according to claim 10, further comprising determining a plurality of first-type channel qualities respectively using a plurality of first-type radio signals; wherein:
the first radio signal is one of the plurality of first-type radio signals;
the channel quality of the first link is one of the plurality of first-type channel qualities; and
each of the first-type radio signals comprises a reference signal.

14. The method in the first node according to claim 10, wherein the first information comprises the first maximum power value.

15. A method in a base station for wireless communication, comprising:
transmitting a radio signal; and
receiving first information from a first terminal when a trigger condition is met; wherein:
the trigger condition is determined based on a channel quality of a first link between the first terminal and a second terminal, and a channel quality of a second link between the first terminal and the base station;
the channel quality of the first link is determined based on a first radio signal, and is used for determining a first power value;
the channel quality of the second link is determined based on the radio signal, and is used for determining a second power value;
the first information comprises a first parameter indicating a difference between a first maximum power value and the first power value, and a second parameter indicating a difference between the second maximum power value and the second power value;
transmitted power values of radio signals transmitted by the first terminal on the first link are limited by the first maximum power value; and
transmitted power values of radio signals transmitted by the first terminal on the second link are limited by the second maximum power value.

16. The method in the base station according to claim 15, wherein the trigger condition is met when a change in the channel quality of the second link is greater than a second specific threshold and a change in the channel quality of the first link is greater than a first specific threshold.

17. The method in the base station according to claim 15, wherein:
the base station transmits second information to the first terminal through Radio Resource Control signalings, comprising timer configurations for respectively configuring a first timer of the first link and a second timer of the second link;
the first radio signal is one of a plurality of first-type radio signals; the first-type radio signals are used by the first terminal to determine a plurality of first-type channel qualities respectively;
the channel quality of the first link is one of the first-type channel qualities; and
each of the first-type radio signals comprises a reference signal.

18. The method in the base station according to claim 15, wherein the first information comprises the first maximum power value.

* * * * *